US010353219B1

(12) United States Patent
Hannaford et al.

(10) Patent No.: US 10,353,219 B1
(45) Date of Patent: Jul. 16, 2019

(54) DEVICE, METHOD AND SYSTEM TO PROVIDE ACCOMMODATION DURING A STEREOSCOPIC DISPLAY

(71) Applicant: VERILY LIFE SCIENCES LLC, Mountain View, CA (US)

(72) Inventors: Blake Hannaford, Seattle, WA (US); Brian Otis, Saratoga, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 418 days.

(21) Appl. No.: 14/831,671

(22) Filed: Aug. 20, 2015

(51) Int. Cl.
*G02C 7/04* (2006.01)
*G02C 7/08* (2006.01)
(Continued)

(52) U.S. Cl.
CPC .......... *G02C 7/041* (2013.01); *G02C 7/04* (2013.01); *G02C 7/043* (2013.01); *G02C 7/08* (2013.01); *G02C 7/081* (2013.01); *G02C 7/083* (2013.01); *G06F 3/013* (2013.01); *H04N 13/30* (2018.05); *H04N 13/332* (2018.05); *H04N 13/334* (2018.05); *H04N 13/366* (2018.05);
(Continued)

(58) Field of Classification Search
CPC .......... H04N 13/0429; H04N 13/344; H04N 13/322; H04N 13/30; H04N 13/332; H04N 13/334; H04N 13/366; H04N 13/383; G02C 7/04; G02C 7/041; G02C 7/043; G02C 7/08; G02C 7/081; G02C 7/083; G02C 7/085
See application file for complete search history.

(56) References Cited

U.S. PATENT DOCUMENTS 5,717,453 A * 2/1998 Wohlstadter .......... G02B 3/14
348/46
6,243,207 B1 * 6/2001 Kawamura .......... H04N 13/398
359/630
(Continued)

OTHER PUBLICATIONS

D. M. Hoffman, A.R. Girshick, K. Akeley, & M.S. Banks, "Vergence-accommodation conflicts hinder visual performance and cause visual fatigue", 8 J. of Vision 33-62 (Mar. 2008).*
(Continued)

*Primary Examiner* — David N Werner
(74) *Attorney, Agent, or Firm* — Christensen O'Connor Johnson Kindness PLLC (57) ABSTRACT

Techniques and mechanisms for determining a level of accommodation to be provided by an eye-mountable device (EMD) for a user viewing a 3D stereoscopic display. In one embodiment, the EMD in disposed in or on an eye of the user, and an angle of vergence between the user's eyes is detected. Based on the angle of vergence, the EMD provides a level of accommodation that results in the user having a blurred viewing of an object in the stereoscopic display. The blur induces the user to change the accommodation provided by the eye on which, or in which, the EMD is disposed. Inducing the user to perform such a change in the eye's accommodation more closely approximates what the user would do when viewing real world physical objects. This tends to result in a better viewing experience by the user. In another embodiment, the angle of vergence is detected based on exposure of the EMD to a magnetic field.

23 Claims, 7 Drawing Sheets

(51) Int. Cl.
*H04N 13/30* (2018.01)
*H04N 13/332* (2018.01)
*H04N 13/334* (2018.01)
*H04N 13/366* (2018.01)
*H04N 13/383* (2018.01)
*G06F 3/01* (2006.01)
*G02B 27/00* (2006.01)
*G02B 27/01* (2006.01)
*H04N 13/344* (2018.01)

(52) U.S. Cl.
CPC ....... *H04N 13/383* (2018.05); *G02B 27/0093* (2013.01); *G02B 27/0172* (2013.01); *G02B 27/0179* (2013.01); *G02B 2027/0134* (2013.01); *G02B 2027/0187* (2013.01); *H04N 13/344* (2018.05); *H04N 2213/008* (2013.01)

(56) References Cited

U.S. PATENT DOCUMENTS

| | | | |
|---|---|---|---|
| 6,307,589 B1 * | 10/2001 | Maguire, Jr. ...... | G02B 27/2228 348/333.03 |
| 7,439,940 B1 * | 10/2008 | Maguire, Jr. ...... | G02B 27/2228 345/7 |
| 8,786,675 B2 | 7/2014 | Deering | |
| 9,058,053 B2 | 6/2015 | Covington | |
| 9,841,602 B2 * | 12/2017 | Osterhout ......... | G02B 27/0172 |
| 2006/0232665 A1 * | 10/2006 | Schowengerdt ... | G02B 27/0093 348/51 |
| 2011/0304689 A1 * | 12/2011 | Sezan ............... | H04N 13/0033 348/43 |
| 2013/0222384 A1 * | 8/2013 | Futterer ............ | G02B 5/32 345/426 |
| 2014/0104665 A1 | 4/2014 | Popovich et al. | |
| 2014/0264978 A1 * | 9/2014 | Pugh ............... | B29D 11/00807 264/1.7 |
| 2014/0267231 A1 * | 9/2014 | Younkin ........... | H04N 13/0033 345/419 |
| 2014/0285641 A1 | 9/2014 | Kato et al. | |
| 2015/0178939 A1 | 6/2015 | Bradski et al. | |

OTHER PUBLICATIONS

S. Zhang, "The Obscure Neuroscience Problem That's Plaguing VR", Wired, Aug. 11, 2015.*

M.B. McCamy, J. Otero-Millan, R.J. Leigh, S.A. King, R.M. Schneider, S.L. Macknik, & S. Martinez-Conde, "Simultaneous Recordings of Human Microsaccades and Drifts with a Contemporary Video Eye Tracker and the Search Coil Technique", PLoS ONE (Jun. 2, 2015).*

Pletcher, Nathan et al., "Method, Device and System for Accessing an Eye-Mountable Device with a User Interface", U.S. Appl. No. 14/702,528, filed May 1, 2015, 44 pages.

Ho, Harvey et al., "Input Detection System", U.S. Appl. No. 13/630,864, filed Sep. 28, 2012, 44 pages.

Liu, Sheng et al., "A Novel Prototype for an Optical See-Through Head-Mounted Display with Addressable Focus Cues", IEEE Transactions on Visualization and Computer Graphics, vol. 16, No. 3, May/Jun. 2010, 13 pages.

* cited by examiner

DEVICE, METHOD AND SYSTEM TO PROVIDE ACCOMMODATION DURING A STEREOSCOPIC DISPLAY

BACKGROUND

1. Technical Field

This disclosure relates generally to the field of optics, and in particular but not exclusively, relates to contact lenses.

2. Background Art

Humans use three main cues for the depth component of three dimensional (3D) visual perception. One cue is the increasingly blurred viewing of an object as it gets closer to a viewer's eye. Accommodation is a process by which an eye adjusts its focal distance to maintain focus on objects of varying distance. Accommodation is controlled by contractions of the ciliary muscle. The ciliary muscle encircles the eye's elastic lens and applies a force on the elastic lens during muscle contractions that change the focal point of the elastic lens. Recent technologies have begun to provide for various devices that operate in or on a human eye to aid the visual focus of a user. For one type of these devices, an accommodating lens includes one or more liquid crystal elements and circuitry to apply an electrical current to change the index of refraction of the one or more elements.

Another of the three cue for depth perception, commonly referred to retinal disparity, relates to a right-left difference between the respective locations of an object as viewed by a left eye and as viewed by a right eye. The third cue is vergence: the tendency of two eyes to be directed more for gazing towards each other when viewing an object nearby (and to be directed more for gazing away from each other when viewing an object farther away).

The human brain has evolved to expect a close correspondence of these three cues to one another when viewing physical objects in the real world. However, in existing three-dimensional (3D) display technologies the blur cue is absent because the display is placed at a fixed optical distance from the eye. This results in a discrepancy in the correspondence between the cues that can be perceived, however subconsciously, by many viewers. Consequently, viewers often tend to have difficulty perceiving the 3D effect of a stereoscopic display, and can experience headaches, nausea or other symptoms.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments of an apparatus, system and methods of determining operation of an eye-mountable, accommodation-capable device are described herein. In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain embodiments variously provide techniques and/or mechanisms to determine a level of accommodation to be provided by an eye-mountable device (EMD) disposed in or on an eye of a user who is viewing a stereoscopic display (e.g., a stereoscopic presentation of a still image or a video). The stereoscopic display may be presented using one or more display screens which are opaque to the outside world and which present graphical information in an immersive display. In another embodiment, a stereoscopic display is presented using one or more transparent display screens which superimpose graphics on a view of the external environment.

In one embodiment, the user of a stereoscopic display system, such as an immersive head mountable device (HMD), wears a contact lens or other EMD that is capable of providing any of various levels of accommodation. The EMD may include or communicate with sensors or circuitry configured to determine a vergence angle between respective directions of gaze by the eyes of the user. Based on the vergence angle, the EMD may provide a particular level of accommodation during the presentation of the stereoscopic display. In some embodiments, the level of accommodation provided by the EMD, in combination with a concurrent accommodation provided by the eye on which (or in which) the EMD is disposed, results in a blurred viewing of an object in the stereoscopic display. This blur may induce the user, consciously or unconsciously, to change the level of accommodation provided by that eye. Inducing such a change in accommodation by the user's own eye may approximate changes to accommodation that would take place during viewing of a real world physical object. Consequently, certain embodiments may provide for a correspondence between depth perception visual cues (blur, retinal disparity, and vergence) that more closely follows a correspondence expected by the human brain.

Figure 1:
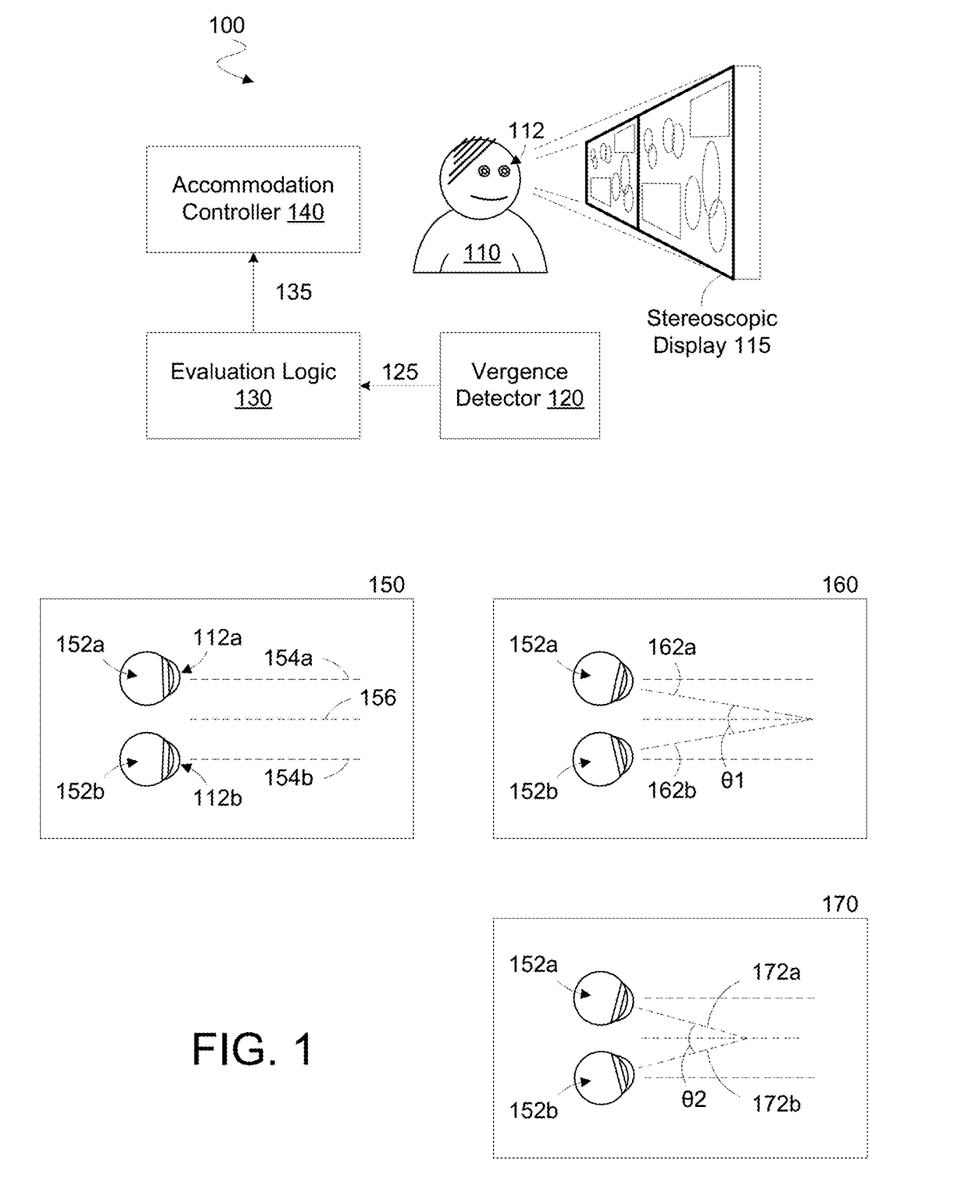
FIG. 1 illustrates elements of an environment in which an eye-mountable device is to operate, in accordance with an embodiment of the disclosure.

FIG. 1 illustrates features of a system 100 to operate according to an embodiment while a user 110 is viewing a stereoscopic display 115 with at least one eye-mountable device 112 disposed in or on an eye of user 110. Stereoscopic display 115, which is represented symbolically in FIG. 1 as a pair of screens showing respective versions of an image, may include functionality to present a 3D display to user 110. Stereoscopic display 115 may include content representing, for example, a virtual reality, an augmented reality or a real world environment that is remote from system 100 and user 110. Presentation of such a 3D display may include operations adapted from any of a variety of conventional stereoscopic imaging and display techniques, which are not detailed herein and are not limiting on certain embodiments. Stereoscopic display 115 may be included in or, alternatively, coupled to (and distinct from) system 100, in different embodiments.

At different times while viewing content of stereoscopic display 115, user 110 may be induced, consciously or unconsciously, to change an angle of vergence between his eyes—e.g., as image elements are variously represented as being at different distances from user 110. As illustrated in the top-side view represented in inset 150, eyes 152a, 152b of a user (e.g., user 110) may have EMDs 112a, 112b disposed thereon, respectively. At the time represented in inset 150, a direction of gaze 154a of eye 152a and a direction of gaze 154b of eye 152b are in parallel with one another, as well as with a mid-line 156 extending between eyes 152a, 152b. This may correspond to the user attempting to view an object at an effectively unlimited ("horizon") distance. At the time represented in inset 160, a direction of gaze 162a of eye 152a and a direction of gaze 162b of eye 152b may cross with one another at a vergence angle $\theta 1$. This vergence angle $\theta 1$ may correspond, for example, to the user attempting to view in a medium range of distances. Finally, at the time represented in inset 170, a direction of gaze 172a of eye 152a and a direction of gaze 172b of eye 152b may cross with one another at a vergence angle $\theta 2$. The vergence angle $\theta 2$ may correspond, for example, to the user attempting to view in a shortest range of distances.

System 100 may include a vergence detector 120 to determine an angle of vergence between a direction of gaze by a first eye of a user and a direction of gaze by a second eye of the user during presentation of a stereoscopic display. Determining such an angle of vergence (or "vergence angle") may include calculating, selecting or otherwise determining an angle of convergence (and/or an angle of divergence) between respective directions of gaze by the user's eyes. Detecting the angle of vergence may be based on any of various sensor operations including, but not limited to, sensing a position or orientation of EMD 112 relative to a magnetic field, capturing an image of the user's eyes with a camera of an eye tracking system, and sensing a distance between different EMDs used by user 110. Such sensing may be performed at EMD 112 or, alternatively, performed with a device that is remote from EMD 112. Vergence detector 120 may be a component of EMD 112, although certain embodiments are not limited in this regard.

Vergence detector 120 may output to evaluation logic 130 a signal 125 specifying or otherwise indicating the angle of vergence between the eyes of user 110. Evaluation logic 130 and vergence detector 120 may reside in one device or, alternatively, may be in different respective devices that, for example, communicate wirelessly with one another. In an embodiment, evaluation logic 130 determines a level of accommodation that is associated with the angle of vergence indicated by signal 125. For example, evaluation logic 130 may include or otherwise have access to a predetermined lookup table, equation or other reference information (not shown) that indicates an association of one or more vergence angles each with a respective accommodation level. Based on signal 125, evaluation logic 130 may perform a look up, a calculation or other operation to identify a level of accommodation to be provided by EMD 112. In one embodiment, identifying the level of accommodation includes determining that some predetermined marginal change in accommodation is to be applied to the current accommodation level provided by EMD 112 (e.g., regardless of what the current accommodation level is). Evaluation logic may then send a signal 135 to an accommodation controller 140 that, for example, resides on EMD 112. In response to signal 135, accommodation controller 140 may transition EMD 112 to a mode to provide the identified level of accommodation.

In some embodiments, the determining of an accomodation level by evaluation logic 130 is based on one or more additional variables. By way of illustration and not limitation, such variables may include a level of illumination or brightness of at least some region of a display screen, information describing a texture or other property of an object represented in the stereoscopic display, an opthalmic prescription of the user and/or other related information.

Figure 2:
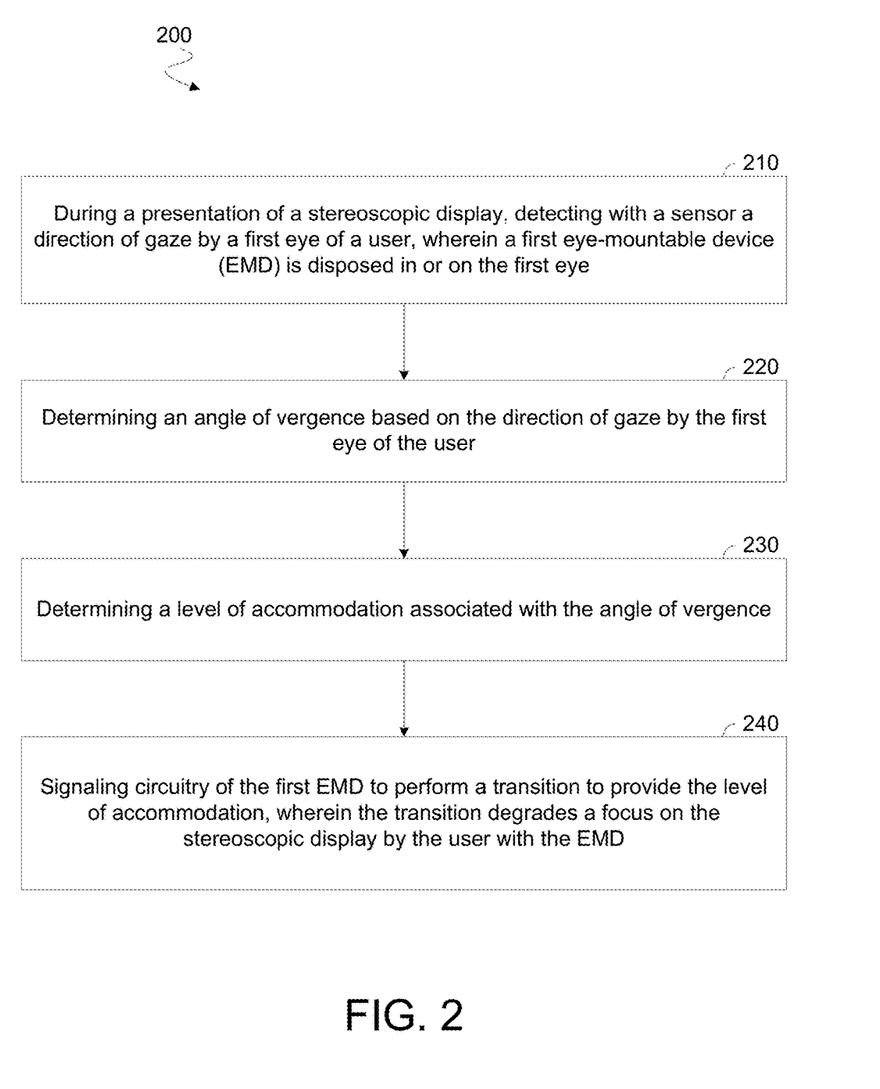
FIG. 2 is a flow diagram illustrating elements of a method to determine an accommodation level of an eye-mountable device according to an embodiment.

FIG. 2 illustrates elements of a method 200 to determine an accommodation by an EMD according to an embodiment. Method 200 may include operations performed with some or all components of system 100, for example. Certain embodiments include performance of only some operations of method 200. For example, a method according to one embodiment includes only some operations of method 200, where such operations are performed at an EMD. A method according to another embodiment includes only some operations of method 200, where such operations are performed at a remote device that communicates wirelessly with an EMD.

Method 200 may include, at 210, detecting a direction of gaze by a first eye of a user, wherein a first eye-mountable device (EMD) is disposed in or on the first eye. The detecting may be performed at 210 with a sensor during a presentation of a stereoscopic display that is viewed by the user.

For example, one or more sensors may perform respective sensing while a first accommodation-capable EMD is disposed in or on a first eye of the user and, in some embodiments, while a second accommodation-capable EMD is disposed in or on a second eye of the user. Such one or more sensors may include a sensor that is integrated within an EMD, within a stereoscopic display device, within a device that can be removably attached to a stereoscopic display device, or within a handheld device. The one or more sensors may sense a first direction of gaze by the first eye and a second direction of gaze by the second eye. As detailed herein, such sensing may, in some embodiments, be based on an interaction between an EMD and a magnetic field in the surrounding environment. For example, such an interaction may result in a current being induced at the EMD, where the current is measured to detect an orientation of the EMD (and thus an orientation of the user's eye) relative to a direction of the magnetic field. In one embodiment, the magnetic field is generated in a first EMD disposed in or on a first eye of the user, and sensed in a second EMD disposed in or on a second eye of the user, thus giving a relative measurement of the vergence angle. In another embodiment, each EMD senses its absolute angle relative to an external magnetic field, where a vergence angle is derived from the two separate absolute measurements.

Alternatively or in addition, sensing a direction of gaze may be based on an evaluation, by an eye-tracking unit, of a captured image that represents one or both of the user's eyes. By way of example and not limitation, such an eye-tracking unit may calculate, based on the image, a proximity of a first iris to a second iris, a proximity of a first pupil to a second pupil, or the like. In some embodiments, sensing a direction of gaze is further or alternatively based on a wireless communication between two EMDs. For example, a first EMD may calculate, based on timing information associated with the exchange of the wireless communication, a distance between respective communication circuits of the first EMD and the second EMD.

Based on the detecting at 210, method 200 may further determine, at 220, an angle of vergence based on the direction of gaze of the first eye. The angle of vergence may be an angle between the respective directions of gaze by the first eye of the user and a second eye of the user. Determining the vergence angle at 220 may include selecting, calculating or otherwise determining an angle value at a HMD (or other stereoscopic display device), at a device that is removably coupled to the EMD, at an EMD, or at a handheld device. Such determining may include performing an addition, subtraction or other mathematical operation based on one or more values representing gaze direction detected at 210.

Although some embodiments are not limited in this regard, determining the angle of vergence at 220 may include, or be based on, sensor information being communicated—e.g., wirelessly—from one device to another device, the sensor information indicating a direction of gaze of a user's eye. For example, the sensor information may need to be communicated for processing with other sensor information which indicates a direction of gaze of the user's other eye. The sensor information may include or be derived from a captured image that is to be sent from a camera—e.g., disposed in or on a HMD—to a processing unit of an eye tracking system. In another embodiment, sensor information includes a current that is magnetically-induced at an EMD, where the current is sent to signal processor circuitry and/or other evaluation logic of the EMD. Any of a variety of exchanges of sensor information may be performed, according to different embodiments. For example, sensor information may be sent from a HMD or other stereoscopic display device. Alternatively or in addition, sensor information may be sent to handheld device, such as a smart phone, a tablet computer or a special-purpose device (for brevity, referred to herein as an "auxiliary device") that has dedicated logic to configure, communicate with and/or otherwise access the EMD. In some embodiments, sensor information may be sent to (or alternatively, from) an EMD—e.g., where the sensor information identifies a first direction of gaze of that EMD or identifies a second direction of gaze of another EMD. A direction of gaze may be identified with respect to some reference direction that, for example, is unmoving in a frame of reference of a stereoscopic display device. For example, such a reference direction may be normal to a plane of the stereoscopic display.

Method 200 may further comprise, at 230, determining a level of accommodation associated with the angle of vergence. The determining at 230 may be performed at an EMD that is to provide the level of accommodation, for example. Alternatively, the determining at 230 may be performed at a remote device that can communicate wirelessly with the EMD—e.g., at another EMD, at a HMD, at hardware that is removably coupled to such a HMD, or at a handheld device.

Determining the level of accommodation at 230 may include accessing predetermined reference information that associates multiple vergence angles each with a different respective accommodation level. The reference information may be selected, calculated or otherwise determined based on information indicating a visual acuity of the user. Although some embodiments are not limited in this regard, determining the level of accommodation at 230 may include, or be based on, vergence angle information being communicated—e.g., wirelessly—from one device to another device. For example, the vergence angle determined at 220 may be communicated from a stereoscopic display device, from hardware that is removably coupled to a stereoscopic display device, or from a handheld device. The vergence angle may be communicated to an EMD, in some embodiments.

Method 200 may further comprise, at 240, signaling circuitry of a first EMD to perform a transition to provide the level of accommodation. In an embodiment, the transition degrades a focus on the stereoscopic display by the user with the EMD. For example, reference information used to determine the accommodation level at 230 may be based on a particular level of acuity (or range of such levels) that corresponds to the acuity of an eye of the user. As a result, that eye's own accommodation, in combination with the level of accommodation to be provided by an EMD in or on that eye, may contribute to a desired amount of blur in the user's viewing of the stereoscopic display. Accordingly, the reference information may associate with a given vergence angle an accommodation level that is sub-optimal, given the acuity of the user's eye, for the user to focus on an object represented in the stereoscopic display. The resulting blur may induce the user to adjust the eye's own accommodation in a way which would similarly take place when viewing an actual physical object (or objects), rather than a stereoscopic representation of the object/objects.

In some embodiments, method 200 further comprises one or more operations (not shown) to subsequently readjust the level of accommodation provided by the first EMD. Such readjustment may be based on an expectation that the user has adjusted, or is trying to adjust, the eye's own level of accommodation in response to image blur resulting from the signaling at 240. The accommodation readjustment may improve a focus on the stereoscopic display by the user with the EMD. The degree and timing of such readjustment may be based, for example, on clinical evaluation of the user's viewing behavior and/or statistical information describing viewing behavior of a sampled population of people.

Figure 3:
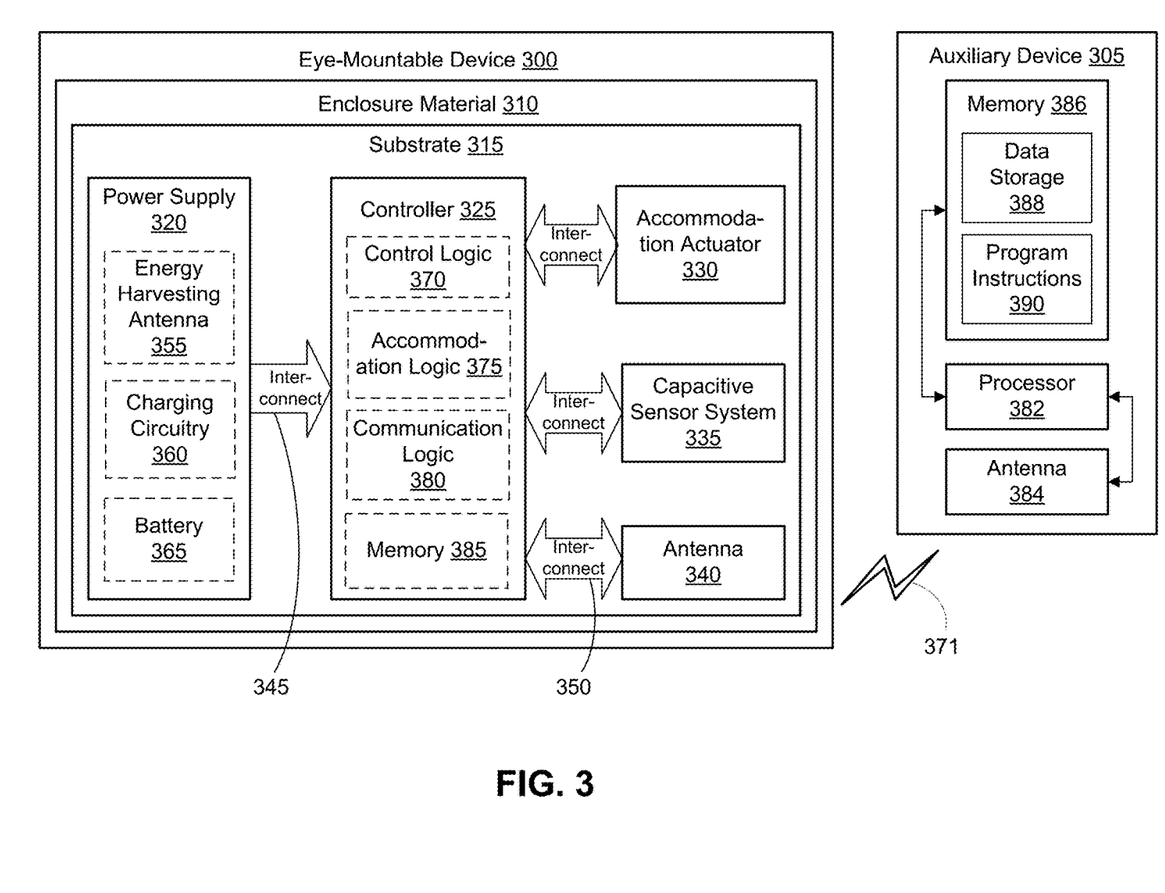
FIG. 3 is a functional block diagram of an eye-mountable device for auto-accommodation along with an external reader, in accordance with an embodiment of the disclosure.

FIG. 3 is a functional block diagram of an accommodation-capable eye-mountable device 300 to be accessed via an auxiliary device 305, in accordance with an embodiment of the disclosure. An exposed portion of EMD 300 may include an enclosure material 310 formed to be contact-mounted to a corneal surface of an eye. A substrate 315 may be embedded within or surrounded by enclosure material 310 to provide a mounting surface for a power supply 320, a controller 325, an accommodation actuator 330, a capacitive sensor system 335, an antenna 340, and various interconnects 345 and 350. The illustrated embodiment of power supply 320 includes an energy harvesting antenna 355, charging circuitry 360, and a battery 365. The illustrated embodiment of controller 325 includes control logic 370, accommodation logic 375, and communication logic 380. The illustrated embodiment of auxiliary device 305 includes a processor 382, an antenna 384, and memory 386. The illustrated embodiment of memory 386 includes data storage 388 and program instructions 390.

Controller 325 may be coupled to receive feedback control signals from capacitive sensor system 335 and further coupled to operate accommodation actuator 330. Power supply 320 supplies operating voltages to the controller 325 and/or the accommodation actuator 330. Antenna 340 may be operated by the controller 325 to communicate information to and/or from eye-mountable device 300. In one embodiment, antenna 340, controller 325, power supply 320, and capacitive sensor system 335 are all situated on the embedded substrate 315. In one embodiment, accommodation actuator 330 may be embedded within enclosure material 310, but is not disposed on substrate 315. Because eye-mountable device 300 includes electronics and is configured to be contact-mounted to an eye, it is also referred to herein as an ophthalmic electronics platform, contact lens, or smart contact lens.

To facilitate contact-mounting, the enclosure material 310 may have a concave surface configured to adhere ("mount") to a moistened corneal surface (e.g., by capillary forces with a tear film coating the corneal surface). Additionally or alternatively, the eye-mountable device 300 may be adhered by a vacuum force between the corneal surface and enclosure material 310 due to the concave curvature. While mounted with the concave surface against the eye, the outward-facing surface of the enclosure material 310 may have a convex curvature that is formed to not interfere with eye-lid motion while the eye-mountable device 300 is mounted to the eye. For example, the enclosure material 310 may be a substantially transparent curved disk shaped similarly to a contact lens.

Enclosure material 310 may include one or more biocompatible materials, such as those employed for use in contact lenses or other ophthalmic applications involving direct contact with the corneal surface. Enclosure material 310 may optionally be formed in part from such biocompatible materials or may include an outer coating with such biocompatible materials. Enclosure material 310 may include materials configured to moisturize the corneal surface, such as hydrogels and the like. In some instances, enclosure material 310 may be a deformable ("non-rigid") material to enhance wearer comfort. In some instances, enclosure material 310 may be shaped to provide a predetermined, vision-correcting optical power, such as can be provided by a contact lens. Enclosure material may be fabricated of various materials including a polymeric material, a hydrogel, PMMA, silicone based polymers (e.g., fluoro-silicon acrylate), or otherwise.

Substrate 315 includes one or more surfaces suitable for mounting the capacitive sensor system 335, controller 325, power supply 320, and antenna 340. Substrate 315 may be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide) may be patterned on substrate 315 to form circuitry, electrodes, etc. For example, antenna 340 may be formed by depositing a pattern of gold or another conductive material on substrate 315. Similarly, interconnects 345 and 350 may be formed by depositing suitable patterns of conductive materials on substrate 315. A combination of resists, masks, and deposition techniques may be employed to pattern materials on substrate 315. Substrate 315 may be a relatively rigid material, such as polyethylene terephthalate ("PET") or another material sufficient to structurally support the circuitry and/or electronics within enclosure material 310. Eye-mountable device 300 may alternatively be arranged with a group of unconnected substrates rather than a single substrate. For example, controller 325 and power supply 320 may be mounted to one substrate, while antenna 340 and capacitive sensor system 335 are mounted to another substrate and the two may be electrically connected via interconnects.

In some embodiments, power supply 320 and controller 325 (and the substrate 315) may be positioned away from the center of eye-mountable device 300 and thereby avoid interference with light transmission to the eye through the center of eye-mountable device 310. In contrast, accommodation actuator 330 may be centrally positioned to apply optical accommodation to the light transmitted to the eye through the center of eye-mountable device 310. For example, where eye-mountable device 300 is shaped as a concave-curved disk, substrate 315 may be embedded around the periphery (e.g., near the outer circumference) of the disk. In some embodiments, capacitive sensor system 335 includes one or more discrete capacitance sensors that are peripherally distributed to sense the eyelid overlap. In some embodiments, one or more capacitance sensors may also be positioned in the center region of eye-mountable device 300. Capacitive sensor system 335 and/or substrate 315 may be substantially transparent to incoming visible light to mitigate interference with light transmission to the eye.

Substrate 315 may be shaped as a flattened ring with a radial width dimension sufficient to provide a mounting platform for the embedded electronics components. Substrate 315 may have a thickness sufficiently small to allow the substrate to be embedded in enclosure material 310 without adversely influencing the profile of eye-mountable device 300. Substrate 315 may have a thickness sufficiently large to provide structural stability suitable for supporting the electronics mounted thereon. For example, substrate 315 may be shaped as a ring with a diameter of about 10 millimeters, a radial width of about 1 millimeter (e.g., an outer radius 1 millimeter larger than an inner radius), and a thickness of about 50 micrometers. Substrate 315 may optionally be aligned with the curvature of the eye-mounting surface of eye-mountable device 300 (e.g., convex surface). For example, substrate 315 may be shaped along the surface of an imaginary cone between two circular segments that define an inner radius and an outer radius. In such an example, the surface of substrate 315 along the surface of the imaginary cone defines an inclined surface that is approximately aligned with the curvature of the eye mounting surface at that radius.

In the illustrated embodiment, power supply 320 includes a battery 365 to power the various embedded electronics, including controller 325. Battery 365 may be inductively charged by charging circuitry 360 and energy harvesting antenna 355. In one embodiment, antenna 340 and energy harvesting antenna 355 are independent antennae, which serve their respective functions of energy harvesting and communications. In another embodiment, energy harvesting antenna 355 and antenna 340 are the same physical antenna that are time shared for their respective functions of inductive charging and wireless communications with auxiliary device 305. Additionally or alternatively, power supply 320 may include a solar cell ("photovoltaic cell") to capture energy from incoming ultraviolet, visible, and/or infrared radiation. Furthermore, an inertial power scavenging system may be included to capture energy from ambient vibrations.

Charging circuitry 360 may include a rectifier/regulator to condition the captured energy for charging battery 365 or directly power controller 325 without battery 365. Charging circuitry 360 may also include one or more energy storage devices to mitigate high frequency variations in energy harvesting antenna 355. For example, one or more energy storage devices (e.g., a capacitor, an inductor, etc.) may be connected to function as a low-pass filter.

Controller 325 contains logic to choreograph the operation of the other embedded components. Control logic 370 controls the general operation of eye-mountable device 300, including providing a logical user interface, power control functionality, etc. Accommodation logic 375 includes logic for monitoring feedback signals from capacitive sensor system 335, determining the current gaze direction or gaze distance of the user, and manipulating accommodation actuator 330 in response to provide the appropriate accommodation. The auto-accommodation may be implemented in real-time based upon feedback from the capacitive gaze tracking, or permit user control to select specific accommodation regimes (e.g., near-field accommodation for reading, far-field accommodation for regular activities, etc.). Circuitry of controller 325 may include or couple to a repository on substrate 315—as represented by the illustrative memory 385 (e.g., including volatile memory cells)—that, for example, is to store data written by such circuitry, data to determine operation of such circuitry and/or data received by (or to be sent from) EMD 300. Such a repository may store log information that describes performance of accommodation logic 375 and/or other components of controller 325.

Communication logic 380 provides communication protocols for wireless communication with auxiliary device 305 via antenna 340. In one embodiment, communication logic 380 provides backscatter communication via antenna 340 when in the presence of an electromagnetic field 371 output from auxiliary device 305. In one embodiment, communication logic 380 operates as a smart wireless radio-frequency identification ("RFID") tag that modulates the impedance of antenna 340 for backscatter wireless communications. The various logic modules of controller 325 may be implemented in software/firmware executed on a general purpose microprocessor, in hardware (e.g., application specific integrated circuit), or a combination of both.

Eye-mountable device 300 may include various other embedded electronics and logic modules. For example, a light source or pixel array may be included to provide visible feedback to the user. An accelerometer or gyroscope may be included to provide positional, rotational, directional or acceleration feedback information to controller 325.

It is noted that the block diagram shown in FIG. 3 is described in connection with functional modules for convenience in description, but does not necessarily connote physical organization. Rather, embodiments of eye-mountable device 300 may be arranged with one or more of the functional modules ("sub-systems") implemented in a single chip, multiple chips, in one or more integrated circuits, or otherwise.

Auxiliary device 305 includes an antenna 384 (or group of more than one antennae) to send and receive wireless signals 371 to and from eye-mountable device 300. Auxiliary device 305 also includes a computing system with a processor 382 in communication with a memory 386. Memory 386 may be a non-transitory computer-readable medium that may include, without limitation, magnetic disks, optical disks, organic memory, and/or any other volatile (e.g. RAM) or non-volatile (e.g. ROM) storage system readable by the processor 382. Memory 386 may include a data storage 388 to store indications of data, such as data logs (e.g., user logs), program settings (e.g., to adjust behavior of eye-mountable device 300 and/or auxiliary device 305), etc. Memory 386 may also include program instructions 390 for execution by processor 382 to cause the auxiliary device 305 to perform processes specified by the instructions 390. For example, program instructions 390 may cause auxiliary device 305 to provide a user interface that allows for retrieving information communicated from eye-mountable device 300 or allows transmitting information to eye-mountable device 300 to program or otherwise select operational modes of eye-mountable device 300. Auxiliary device 305 may also include one or more hardware components for operating antenna 384 to send and receive wireless signals 371 to and from eye-mountable device 300.

Auxiliary device 305 may be a smart phone, digital assistant, or other portable computing device with wireless connectivity sufficient to provide the wireless communication link 371. Auxiliary device 305 may also be implemented as an antenna module that may be plugged in to a portable computing device, such as in an example where the communication link 371 operates at carrier frequencies not commonly employed in portable computing devices. In some instances, auxiliary device 305 is a special-purpose device configured to be worn relatively near a wearer's eye to allow the wireless communication link 371 to operate with a low power budget. For example, the auxiliary device 305 may be integrated in a piece of jewelry such as a necklace, earring, etc. or integrated in an article of clothing worn near the head, such as a hat, headband, etc. In other embodiments, auxiliary device 305 is a personal computer or game console.

Figure 4A:
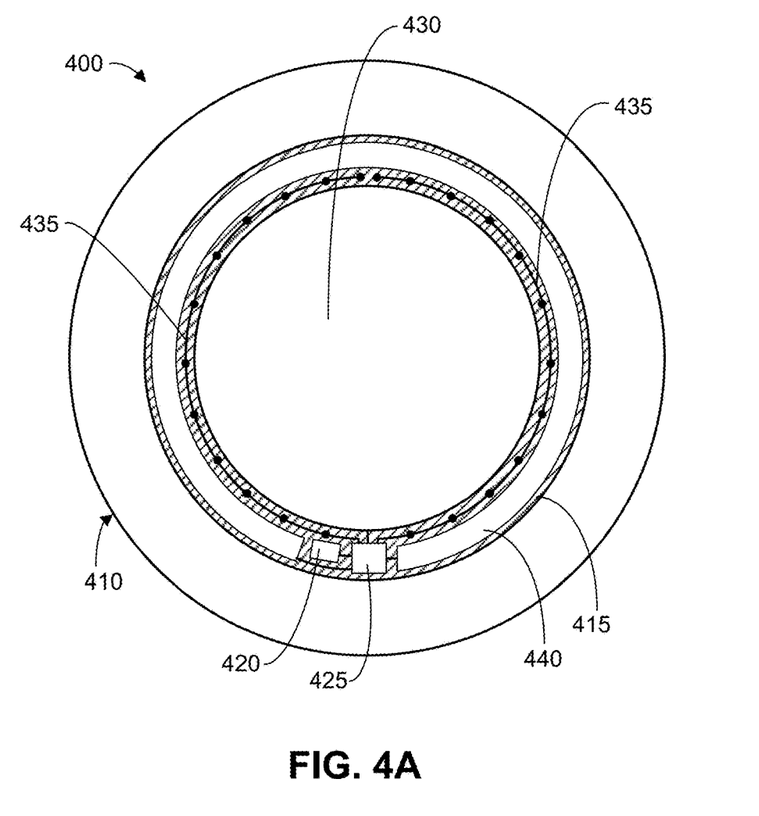
FIG. 4A is a top view of an eye-mountable device, in accordance with an embodiment of the disclosure.
Figure 4B:
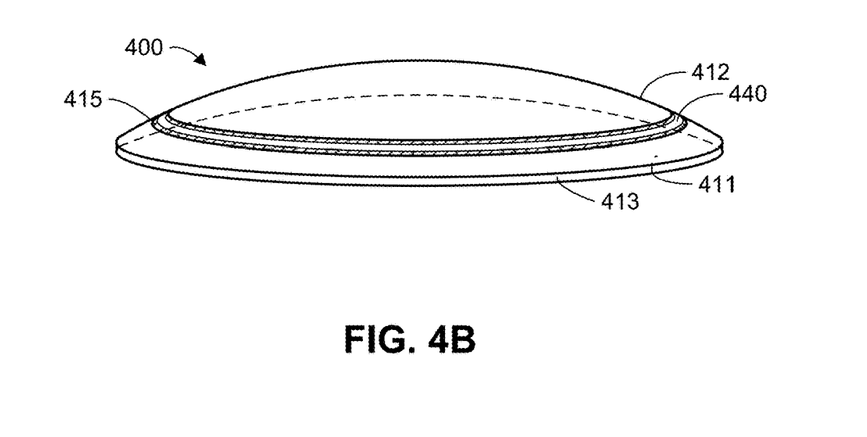
FIG. 4B is a perspective view of an eye-mountable device, in accordance with an embodiment of the disclosure.

FIGS. 4A and 4B illustrate two views of an eye-mountable device 400, in accordance with an embodiment of the disclosure. FIG. 4A is a top view of EMD 400 while FIG. 4B is a perspective view of the same. Eye-mountable device 400 is one possible implementation of eye-mountable device 300 illustrated in FIG. 3. The illustrated embodiment of eye-mountable device 400 includes an enclosure material 410, a substrate 415, a power supply 420, a controller 425, an accommodation actuator 430, a capacitive sensor system 435, and an antenna 440. It should be appreciated that FIGS. 4A and 4B are not necessarily drawn to scale, but have been illustrated for purposes of explanation only in describing the arrangement of the example eye-mountable device 400.

Enclosure material 410 of eye-mountable device 400 may be shaped as a curved disk. Enclosure material 410 is a substantially transparent material to allow incident light to be transmitted to the eye while eye-mountable device 400 is mounted to the eye. Enclosure material 410 may be a biocompatible material similar to those employed to form vision correction and/or cosmetic contact lenses in optometry, such as a polymeric material, polyethylene terephthalate ("PET"), polymethyl methacrylate ("PMMA"), polyhydroxyethylmethacrylate ("polyHEMA"), a hydrogel, silicon based polymers (e.g., fluoro-silicon acrylate) combinations of these, or otherwise. Enclosure material 410 may be formed with one side having a concave surface 411 suitable to fit over a corneal surface of an eye. The opposite side of the disk may have a convex surface 412 that does not interfere with eyelid motion while eye-mountable device 400 is mounted to the eye. In the illustrated embodiment, a circular or oval outer side edge 413 connects the concave surface 411 and convex surface 412.

Eye-mountable device 400 may have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of eye-mountable device 400 may be selected according to the size and/or shape of the corneal surface of the wearer's eye. Enclosure material 410 may be formed with a curved shape in a variety of ways. For example, techniques similar to those employed to form vision-correction contact lenses, such as heat molding, injection molding, spin casting, etc. may be employed to form enclosure material 410.

Substrate 415 may be embedded within enclosure material 410. Substrate 415 may be embedded to be situated along the outer periphery of enclosure material 410, away from the central region where accommodation actuator 430 is positioned. In the illustrated embodiment, substrate 415 encircles accommodation actuator 430. Substrate 415 may not interfere with vision because it is too close to the eye to be in focus and is positioned away from the central region where incident light is transmitted to the light-sensing portions of the eye. In some embodiments, substrate 415 may optionally be formed of a transparent material to further mitigate effects on visual perception. Substrate 415 may be shaped as a flat, circular ring (e.g., a disk with a centered hole). The flat surface of substrate 415 (e.g., along the radial width) may be a platform for mounting electronics and for patterning conductive materials to form electrodes, antenna (e), and/or interconnections.

Capacitive sensor system 435 may be distributed about eye-mountable device 400 to sense eyelid overlap in a manner similar to capacitive touch screens. By monitoring the amount and position of eyelid overlap, feedback signals from capacitive sensor system 435 may be measured by controller 425 to determine the approximate gaze direction and/or focal distance. Capacitive sensor system 435 may be disposed within enclosure material 410 on substrate 415. In the illustrated embodiment, capacitive sensor system 435 is distributed peripherally around accommodation actuator 430 along the inner edge of substrate 415 between antenna 440 and accommodation actuator 430. In other embodiments, capacitive sensor system 435 may be alternatively distributed in or on eye-mountable device 400. In the illustrated embodiment, capacitive sensor system 435 includes a plurality of discrete capacitance sensors coupled to a common read-line; however, various implementations include a single elongated capacitance sensor, a plurality of discrete capacitance sensors, multiple discrete capacitance sensors coupled in parallel via a common read-line, multiple independent branches of parallel coupled discrete capacitance sensors, etc. In another embodiment, photodetectors are variously disposed on eye-mountable device 400 to provide for monitoring of viewing actions based on light levels (e.g., including changes in such levels, etc.) rather than, or in addition to, capacitive sensing.

Accommodation actuator 430 may be centrally positioned within enclosure material 410 to affect the optical power of eye-mountable device 400 in the user's center of vision. In various embodiments, accommodation actuator 430 operates by changing its index of refraction under the influence of controller 425. By changing its refractive index, the net optical power of the curved surfaces of eye-mountable device 400 may be altered, thereby applying controllable accommodation. Accommodation actuator 430 may be implemented using a variety of different electro-active optical devices. For example, accommodation actuator 430 may be implemented using a layer of liquid crystal (e.g., a liquid crystal cell) disposed in the center of enclosure material 410. In other embodiments, accommodation actuator 430 may be implemented using other types of electro-active optical materials such as electro-optic materials that vary refractive index in the presence of an applied electric field. Accommodation actuator 430 may be a distinct device embedded within enclosure material 410 (e.g., liquid crystal cell), or a bulk material having a controllable refractive index. In yet another embodiment, accommodation actuator 430 may be implemented using a deformable lens structure that changes shape under the influence of an electrical signal. Accordingly, the optical power of eye-mountable device 400 may be controlled by controller 425 with the application of electric signals via one or more electrodes extending from controller 425 to accommodation actuator 430.

Accommodation actuator 430 may be implemented using a variety of different liquid crystal structures including nematic liquid crystal, nematic twisted liquid crystal, cholesteric liquid crystal, or blue phase liquid crystal. Since a low switching voltage is desirable for low power chip design, nematic liquid crystals with switching voltages less than 5 V are suitable. With the application of a 5V control signal, refractive index switching ranging from approximately 1.74 in an off-mode to 1.52 in an on-mode is achievable. A refractive index shift of 0.2 should be sufficient to provide near-field accommodation for reading.

Returning to FIG. 4A, loop antenna 440 is a layer of conductive material patterned along the flat surface of the substrate to form a flat conductive ring. In some examples, to allow additional flexibility along the curvature of the enclosure material, loop antenna 440 may include multiple substantially concentric sections electrically joined together. Each section may then flex independently along the concave/convex curvature of eye-mountable device 400. In some examples, loop antenna 440 may be formed without making a complete loop. For instances, antenna 440 may have a cutout to allow room for controller 425 and power supply 420, as illustrated in FIG. 4A. However, loop antenna 440 may also be arranged as a continuous strip of conductive material that wraps entirely around the flat surface of substrate 415 one or more times. For example, a strip of conductive material with multiple windings may be patterned on the backside of substrate 415 opposite controller 425, power supply 420, and capacitive sensor system 435. Interconnects between the ends of such a wound antenna (e.g., the antenna leads) may then be passed through substrate 415 to controller 425.

Figure 5:
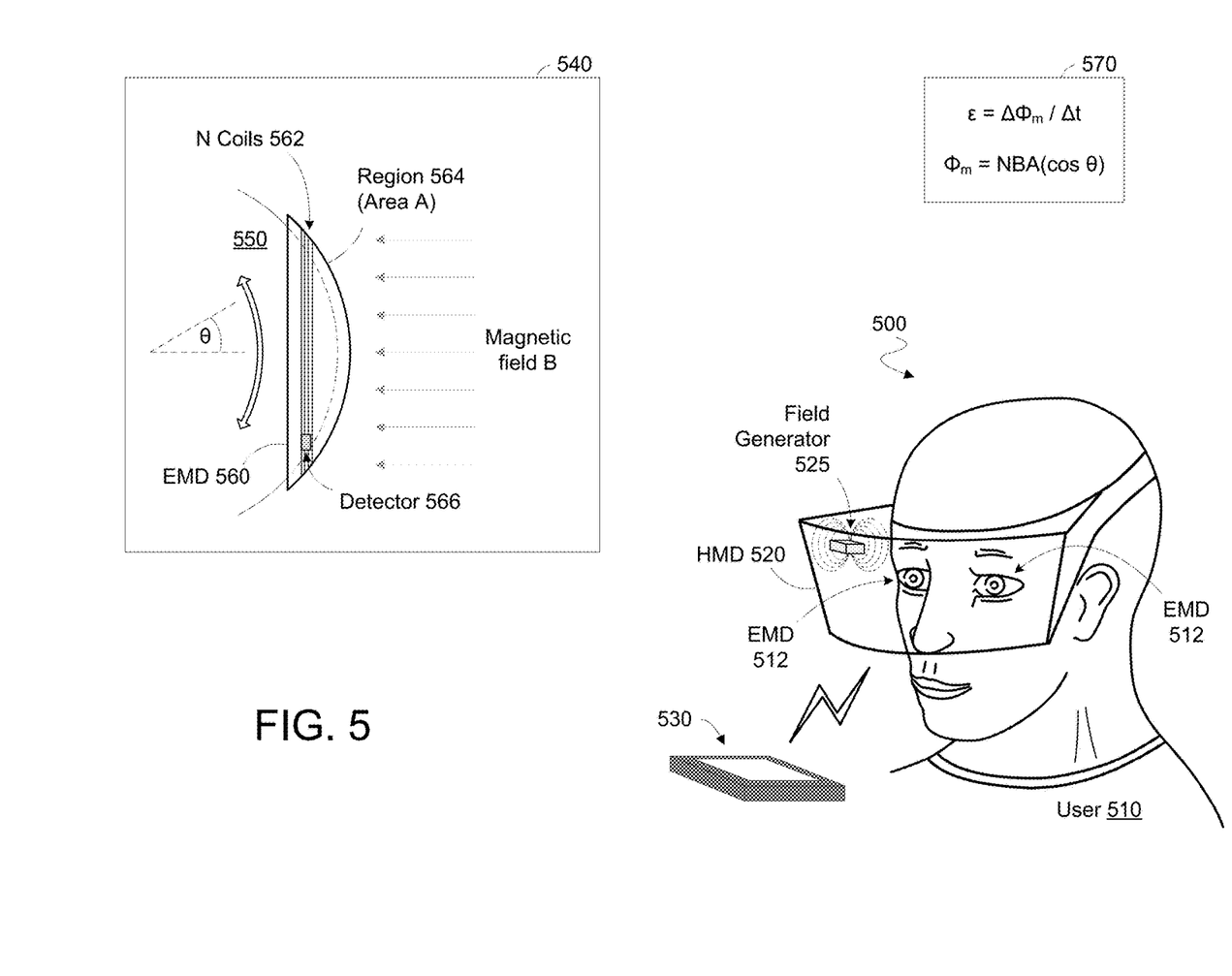
FIG. 5 is a perspective view of a system to determine an accommodation level of an eye-mountable device according to an embodiment.

FIG. 5 illustrates features of a system 500, according to an embodiment, for determining an accommodation to be provided by an eye-mountable device while a user is viewing a stereoscopic display. System 500 may include some or all of the features of system 100, for example. In an embodiment, system 500 is to perform operations of method 200.

In the illustrative embodiment shown, system 500 includes a HMD 520 to provide a stereoscopic display and EMDs 512 variously disposed each in or on a respective eye of a user 510 using system 100. EMDs 512 may variously provide functionality such as that of EMD 112, EMD 300, EMD 400 or the like. In some embodiments, system 500 further comprises another device 530—e.g., a handheld device—to communicate with EMDs 512. However, functionality of device 530 may be integrated into HMD 520 and/or into one or both of EMDs 512, in other embodiments.

System 500 is one example of an embodiment that determines an accommodation to be provided by an EMD, where such determining is based on an exposure of the EMD (and/or another EMD) to a magnetic field. For example, HMD 520 and field generator 525 may be configured to remain in a fixed orientation relative to the head of user 510—e.g., at least while user 510 is viewing a stereoscopic display by HMD 520. During such viewing, a field generator 525, coupled or otherwise disposed in or on HMD 520, may generate a magnetic field that extends into some region including one or both of EMDs 512.

In a detail view of one example embodiment, shown in inset 540, an EMD 560 is disposed on an eye 550, where an enclosure material of EMD 560 has formed therein N coils 562 of a conductor (where N is some positive number). The N coils 562 may encircle a region 564 having a cross-sectional area A. When EMD 560 is exposed to a varying magnetic field B, a current may be induced in N coils 562. The current may be based on an angle of the magnetic field B relative to the cross-sectional plane having area A. The equations in inset 570—representing Faraday's Law—describe an inducing of current in N coils 562 by an electromotive force due to magnetic field B. In the equations of inset 570, $\varepsilon$ is an electromotive force (voltage), $\Delta\Phi m$ is a change $\Delta$ in a magnetic flux $\Phi m$, $\Delta t$ is a change in time t. In the equation describing $\Phi m$, N is a number of loops in the coils, B is that magnetic field strength, A is the cross-sectional area encircled by the N coils, and $\theta$ is the angle between a line normal to plane of coil and a line of direction of B.

In some embodiments, two magnetic field generators may be arranged in a configuration relative to the head of user 510 such that they can generate respective magnetic fields having two different directions at one location. As each of these field generator is variously activated, separately or in combination, the current induced in N coils 562 may be indicative of rotations about more than one axis—e.g., in order to distinguish between rotation of eye 550 about a vertical axis and rotation of eye 550 about a horizontal axis.

EMD 560 may include a detector 566 including circuitry to sense a current generated in N coils 562 by magnetic field B. The current can be used to determine a direction of gaze of eye 550 relative to a known direction of field B, which in turn may be used to determine a vergence angle—e.g., between the eyes of user 510. Such vergence angle information may be then used as a basis for identifying a level of accommodation (e.g., including determining an accommodation level change to implement) to be provided by one or both of EMDs 512. In system 500, field generator 525 is external to EMDs 512. In another embodiment, a magnetic field may be generated instead by current flowing in a coil of one EMD, where the field is then sensed by current induced in a coil in the other EMD.

In one embodiment, one of EMDs 512 communicates a direction of gaze to a remote device—e.g., via wireless communication to device 530 (or alternatively, to signal processing logic integrated into HMD 520). The remote device may receive similar gaze direction information from the other of EMDs 512 and determine a vergence angle between the eyes of user 510. In some embodiments, the remote device further determines for one or each of EMDs 512 a respective accommodation level to be applied by that EMD. The remote device may then communicate accommodation level information wirelessly to EMDs 512. In another embodiment, the remote device instead communicates the vergence angle to one or both of EMDs 512—e.g., where the EMDs 512 are responsible for determining locally whether some change to accommodation is to be performed based on the indicated vergence angle.

Some embodiments, such one having features of system 500, may require a calibration, training or other initial configuration process—e.g., to account for a particular user's face. By way of example and not limitation, such a configuration process may include configuration software and/or other such logic—e.g., included in or coupled to HMD 520—operating to display some sequence of visual targets to user 510 while field generator 525 is exposing EMDs 512 to a magnetic field. The configuration logic may prompt the user—e.g., through visual and/or audio output—to variously view such targets at different times, where the targets each have a known position, apparent distance (depth) from a reference plane, etc. In response, user 512 may provide to system 500 input (e.g., via a microphone, handheld device or the like) variously indicating when such targets are being viewed. The calibration target may continuously move to different positions and perceived depths, where the user indicates by a button press, verbal and/or other means when they are or are not visually tracking the moving target. The calibration software may then variously communicate with EMDs 512 to exchange information indicating various amounts of current generated by coils of EMD 512 during the viewing of respective targets. The various amounts of current generated by coils of EMD 512 may then be associated, directly or indirectly, with respective directions of gaze by user 512.

Figure 6:
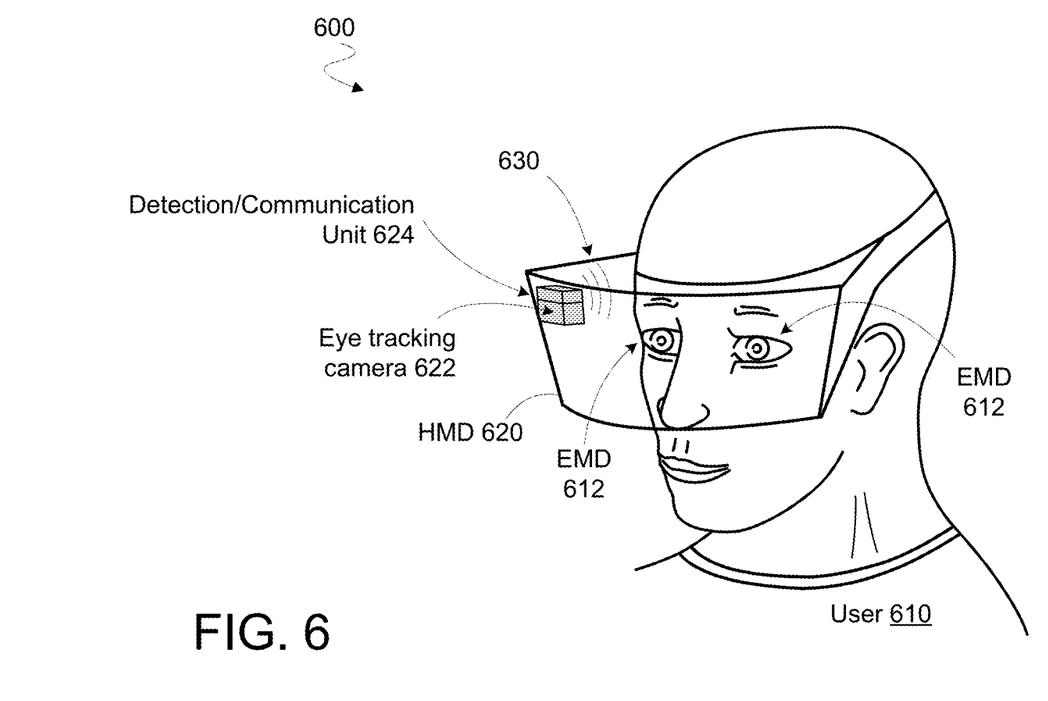
FIG. 6 is a perspective view of a system to determine an accommodation level of an eye-mountable device according to an embodiment.

FIG. 6 illustrates features of a system 600 for determining an accommodation to be provided by an eye-mountable device according to another embodiment. System 600 may include some or all of the features of system 100, for example. In an embodiment, system 600 is to perform operations of method 200.

In the illustrative embodiment shown, system 600 includes a HMD 620 to provide a stereoscopic display, EMDs 612 variously disposed each in or on a respective eye of a user 610 using system 600 and an eye-tracking camera 622. EMDs 612 may provide functionality such as that of EMD 112, EMD 300, EMD 400 or the like. The example embodiment of system 600 does not require any additional device—i.e., other than HMD 620 (and the logic incorporated therein) and EMDs 612. However, in another embodiment, functionality of HMD 620 and EMDs 612 may be distributed across additional devices—e.g., including a handheld device (not shown) such as a smart phone, tablet or an auxiliary device with specialized logic for configuring or otherwise accessing EMDs 612. In one embodiment, an additional device of system 600 includes hardware that is pluggable or otherwise capable of being removably coupled to HMD 620.

System 600 may determine an accommodation to be provided by EMDs 612, where such determining is based on image sensing and eye-tracking logic. For example, HMD 620 may include (or alternatively, couple to) an eye-tracking camera 622 and a detection/communication unit 624 that are to remain in a fixed orientation relative to the stereoscopic display—e.g., at least while user 610 is viewing a stereoscopic display by HMD 620.

Eye-tracking camera 622 may capture one or more images representing the eyes of user 610. Such one or more images may be processed by detection/communication unit 624 to measure respective directions of gaze by the eyes of user 610. The processing may include operations adapted from conventional eye-tracking techniques, which are not detailed herein and which are not limiting on certain embodiments. The directions of gaze may then be evaluated to identify an angle of vergence between the eyes of user 610.

Detection/communication unit 624 may communicate the vergence angle to one or more remote devices—e.g., to one or each of EMDs 612 or some additional device of system 600—where the one or more remote devices each determine a respective accommodation level to be provide by one of EMDs 612. In another embodiment, detection/communication unit 624 determines one or more accommodation levels based on the vergence angle, and further signals EMDs 612 to variously provide such one or more accommodation levels.

Figure 7:
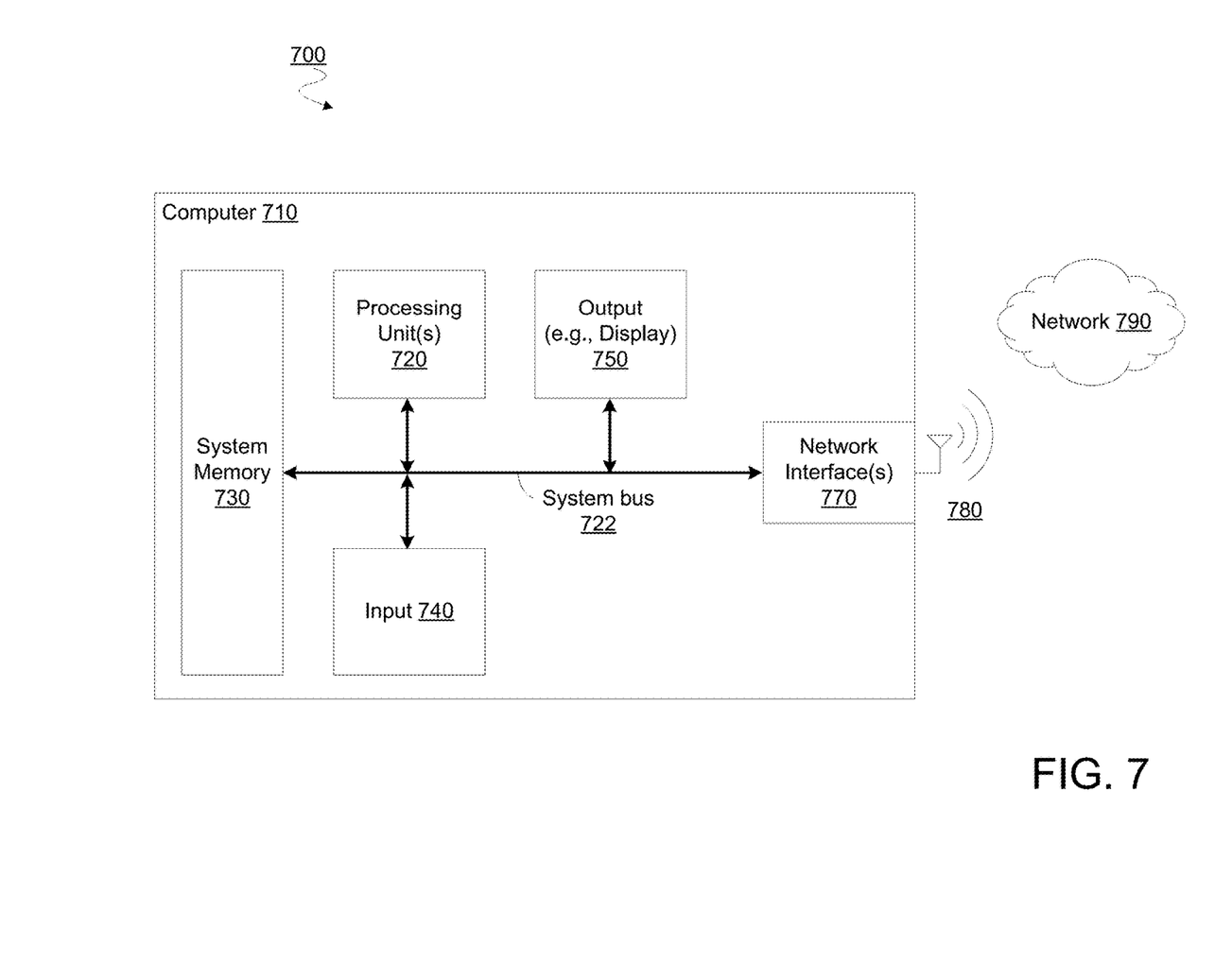
FIG. 7 is a functional block diagram illustrating elements of a system to communicate with an eye-mountable device according to an embodiment.

FIG. 7 illustrates an example of a system 700 in which aspects described in this disclosure can be implemented according to an embodiment. Components of a computer 710 of system 700 may include, but are not limited to, a processing unit 720, a system memory 730, and a system bus 722 that couples various system components including the system memory 730 to the processing unit 720.

Computer 710 typically includes a variety of computer readable media and can be any available media that may be accessed by computer 710. The system memory 730 may include computer storage media in the form of volatile and/or nonvolatile memory such as read only memory (ROM) and/or random access memory (RAM). By way of example, and not limitation, memory 730 may also include an operating system, application programs, other program components, and program data.

A user may enter commands and information into the computer 710 through input devices 740 (e.g., keyboard, keypad, a pointing device, a mouse, stylus, touchpad, touch screen, motion detector, camera, microphone or any other device that allows the user to interact with the computer 710). A monitor or other type of display device may be also connected to the system bus 722 via an interface, such as output interface 750. In addition to a monitor, computer 710 may also include other peripheral output devices such as speakers and a printer, which may be connected through output interface 750.

The computer 710 may operate in a networked or distributed environment—e.g., including computer 710 accessing a wireless network 790 with one or more antennae 780—using logical connections to one or more other remote device. The remote device may be a EMD, HMD, handheld device, personal computer, a server, a router, a network PC, a peer device or other common network node, or any other remote media consumption or transmission device, and may include any or all of the elements described above relative to the computer 710. The logical connections depicted in FIG. 7 include a network 770, such local area network (LAN) or a wide area network (WAN), but can also include other networks e.g., cellular networks.

Techniques and architectures for providing automatic accommodation with an eye-mountable device are described herein. Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   a vergence detector including circuitry to determine an angle of vergence based at least in part on a direction of gaze of a first eye of a user during a presentation of a stereoscopic image; and
   communication logic coupled to the vergence detector to send a signal, based on the angle of vergence determined by the vergence detector, to first and second eye-mountable devices (EMD) disposed in or directly on surfaces of the first eye and a second eye, respectively, the signal including an indication to the first and second EMDs to adjust a level of accommodation provided by accommodation actuators having adjustable optical power within the first and second EMDs to defocus vision of the stereoscopic image and thereby provide a three-dimensional visual perception cue wherein the first and second EMDs that defocus the vision of the stereoscopic image are distinct and separate devices from a display that outputs the stereoscopic image.

2. The device of claim 1, wherein the device is a head mountable stereoscopic display that generates the stereoscopic image, wherein the head mountable stereoscopic display includes a magnetic source disposed in or on the head mountable stereoscopic display, and wherein the angle of vergence is determined based on an interaction between the first EMD and a magnetic field emanating from the magnetic source.

3. The device of claim 1, wherein the angle of vergence is determined based on an evaluation of an image of the first eye, the evaluation performed with an eye-tracking system.

4. The device of claim 1, wherein the angle of vergence is determined based on a signal exchanged wirelessly between the first EMD and the second EMD.

5. The device of claim 1, wherein the device is a head mountable stereoscopic display that generates the stereoscopic image.

6. The device of claim 1, wherein the device comprises a handheld device that communicates wirelessly with the first EMD, or the device comprises a head mountable stereoscopic display that generates the stereoscopic image.

7. The device of claim 1, further comprising evaluation logic to determine the level of accommodation based on the angle of vergence and reference information associating multiple angles of vergence each with a respective accommodation level.

8. The device of claim 1, the communication logic further to signal the first EMD to perform a readjustment to a level of accommodation provided by the first EMD, wherein the readjustment improves a focus on the stereoscopic image by the user with the first EMD.

9. An eye device comprising:
an enclosure material shaped to mount directly on a surface of an eye or within the eye;
an accommodation actuator disposed within the enclosure material having an adjustable optical power to provide variable accommodation to a first eye of a user;
communication logic including circuitry configured to receive wirelessly a signal indicating a level of accommodation, wherein the signal is based on a detection of an angle of vergence based on a direction of gaze by the first eye during a presentation of a stereoscopic display while the contact lens is disposed in or on the first eye; and
evaluation logic coupled to the communication logic and the accommodation actuator, the evaluation logic configured to transition the accommodation actuator to the level of accommodation, wherein the transition defocuses vision of the stereoscopic display to provide a three-dimensional visual perception cue to the user, wherein the eye device, including the accommodation actuator, is a distinct and separate device from the stereoscopic display that generates the presentation output from the stereoscopic display.

10. The eye device of claim 9, further comprising an antenna configured to detect an interaction between the eye device and a magnetic field, wherein the angle of vergence is determined based upon the interaction.

11. The eye device of claim 9, wherein the angle of vergence is detected based on an evaluation of an image of the first eye, the evaluation performed with an eye-tracking system.

12. The eye device of claim 9, wherein the angle of vergence is detected based on a signal exchanged wirelessly between the eye device and a second eye device disposed in or on a second eye of the user.

13. The eye device of claim 9, wherein the communication logic is configured to receive the signal indicating the level of accommodation from a remote device, wherein the remote device identifies the level of accommodation based on the angle of vergence.

14. A method comprising:
determining an angle of vergence based on a direction of gaze of a first eye of a user during a presentation of a stereoscopic image to the user; and
sending a wireless signal to a first eye device disposed in or directly on the first eye, the first eye device including an accommodation actuator having an adjustable optical power to provide variable accommodation to the first eye, wherein the wireless signal is based on the angle of vergence and instructs the first eye device to adjust a level of accommodation provided by the accommodation actuator of the first eye device to defocus vision of the stereoscopic image viewed by the user and thereby provide a three-dimensional visual perception cue to the user, wherein the first eye device comprises an eye-mountable device that mounts directly on or within the first eye and wherein the first eye device that defocuses the vision of the stereoscopic image is a distinct and separate device from a display that outputs the stereoscopic image.

15. The method of claim 14, wherein determining the angle of vergence includes determining based on an interaction between the first eye device and a magnetic field emanating from a magnetic source disposed in or on a head mountable display that outputs the stereoscopic image, wherein the magnetic source maintains a fixed position relative to a head of the user when the head mountable display is worn by the user.

16. The method of claim 14, further comprising determining the level of accommodation based on the angle of vergence and reference information associating multiple angles of vergence each with a respective accommodation level.

17. A method at a first eye-mountable device (EMD) disposed in or in direct contact with a surface of a first eye of a user, the method comprising:
receiving a signal at the first EMD indicating a level of accommodation, wherein the signal is based on an angle of vergence determined from a direction of gaze of the first eye of the user during a presentation of a stereoscopic image to the user;
based on the signal, adjusting the level of accommodation provided by an accommodation actuator having an adjustable optical power of the first EMD to defocus vision of the stereoscopic image viewed by the user and thereby provide a three-dimensional visual perception cue to the user, wherein the first EMD is a distinct and separate device from a display that outputs the stereoscopic image.

18. The method of claim 17, wherein the angle of vergence is detected based on an interaction between the first EMD and a magnetic field.

19. The method of claim 17, wherein the angle of vergence is detected based on another signal exchanged wirelessly between the first EMD and a second EMD disposed in or on a second eye of the user.

20. The method of claim 17, wherein the signal indicates the level of accommodation identified by a remote device based on the angle of vergence.

21. A nontransitory computer-readable storage medium having stored thereon instructions which, when executed by one or more processing units, cause the one or more processing units to perform a method comprising:
- determining an angle of vergence based on a direction of gaze of a first eye of a user during a presentation of a stereoscopic image to the user; and
- sending a signal, based on the determined angle of vergence, to a first eye-mountable device (EMD) disposed in or directly on the first eye, the signal including an indication to the first EMD to adjust a level of accommodation provided by an accommodation actuator having adjustable optical power of the first EMD to defocus vision of the stereoscopic image and thereby provide a three-dimensional visual perception cue to the user, wherein the first EMD, including the accommodation actuator, that defocuses the vision of the stereoscopic image, is a distinct and separate device from a display that outputs the stereoscopic image.

22. The computer-readable storage medium of claim 21, wherein determining the angle of vergence includes determining based on an interaction between the first EMD and a magnetic field.

23. The computer-readable storage medium of claim 21, wherein determining the angle of vergence includes determining based on an evaluation of an image of the first eye, the evaluation performed with an eye-tracking system.

* * * * *